United States Patent
Nakata et al.

(10) Patent No.: US 11,665,048 B2
(45) Date of Patent: May 30, 2023

(54) COMMUNICATION SYSTEM, COMMUNICATION DEVICE, AND ABNORMALITY MONITORING METHOD

(71) Applicant: FUJITSU LIMITED, Kawasaki (JP)

(72) Inventors: Tomoshige Nakata, Kawasaki (JP);
Noriaki Kono, Yokohama (JP);
Masahiro Yokoyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/568,091

(22) Filed: Jan. 4, 2022

(65) Prior Publication Data
US 2022/0311654 A1 Sep. 29, 2022

(30) Foreign Application Priority Data
Mar. 26, 2021 (JP) .............................. JP2021-052704

(51) Int. Cl.
*H04L 41/069* (2022.01)
*H04L 41/0631* (2022.01)
*H04L 41/0686* (2022.01)

(52) U.S. Cl.
CPC .......... *H04L 41/069* (2013.01); *H04L 41/065* (2013.01); *H04L 41/0645* (2013.01); *H04L 41/0686* (2013.01)

(58) Field of Classification Search
None
See application file for complete search history.

(56) References Cited

U.S. PATENT DOCUMENTS

| 5,568,135 A * | 10/1996 | Shinozaki | H04B 17/17 455/67.11 |
| 8,565,754 B2 * | 10/2013 | Noda | H04W 24/08 455/45 |
| 2002/0016874 A1 | 2/2002 | Watanuki et al. | |
| 2009/0052330 A1 * | 2/2009 | Matsunaga | H04L 1/0019 370/242 |

(Continued)

FOREIGN PATENT DOCUMENTS

| JP | H05-100761 A | 4/1993 |
| JP | 2001-326916 A | 11/2001 |
| JP | 2002-26909 A | 1/2002 |

*Primary Examiner* — Ranodhi Serrao
(74) *Attorney, Agent, or Firm* — Myers Wolin, LLC

(57) ABSTRACT

A communication system includes a first communication device and a second communication device. The first communication device includes a first processor that executes a first process including: performing a logging process for recording an operation of the first communication device; monitoring whether an abnormal occurrence is present and suspending the logging process when the abnormal occurrence is detected; and generating a trigger signal that instructs to suspend the logging process when the abnormal occurrence is detected, and a transmitter that transmits the trigger signal. The second communication device includes a receiver that receives the trigger signal transmitted from the first communication device, and a second processor that executes a second process including: performing a logging process for recording an operation of the second communication device; and suspending the logging process when the trigger signal is received by the receiver.

6 Claims, 8 Drawing Sheets

(56) References Cited

U.S. PATENT DOCUMENTS

| | | | |
|---|---|---|---|
| 2010/0197239 A1* | 8/2010 | Catovic | H04W 24/08 |
| | | | 455/67.11 |
| 2010/0273523 A1* | 10/2010 | Nandagopalan | H04W 16/14 |
| | | | 455/552.1 |
| 2015/0281010 A1* | 10/2015 | Matsushima | G06Q 10/20 |
| | | | 709/224 |
| 2017/0264364 A1* | 9/2017 | Aoyama | H04B 10/1141 |
| 2019/0082058 A1* | 3/2019 | Aoki | H04N 1/32406 |
| 2021/0235300 A1* | 7/2021 | Teyeb | H04W 24/10 |
| 2022/0311654 A1* | 9/2022 | Nakata | H04L 41/069 |

* cited by examiner

FIG.3
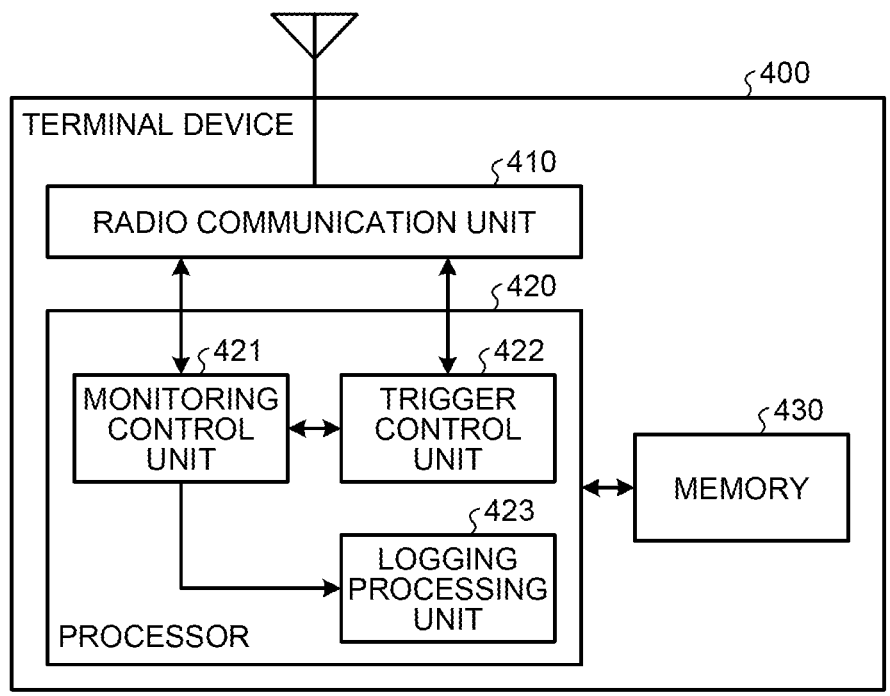
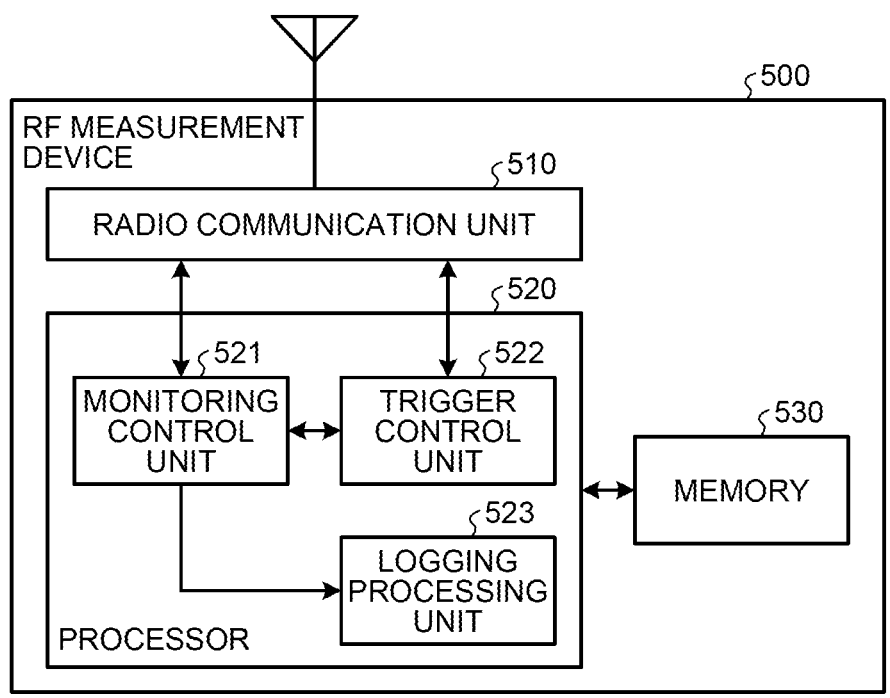

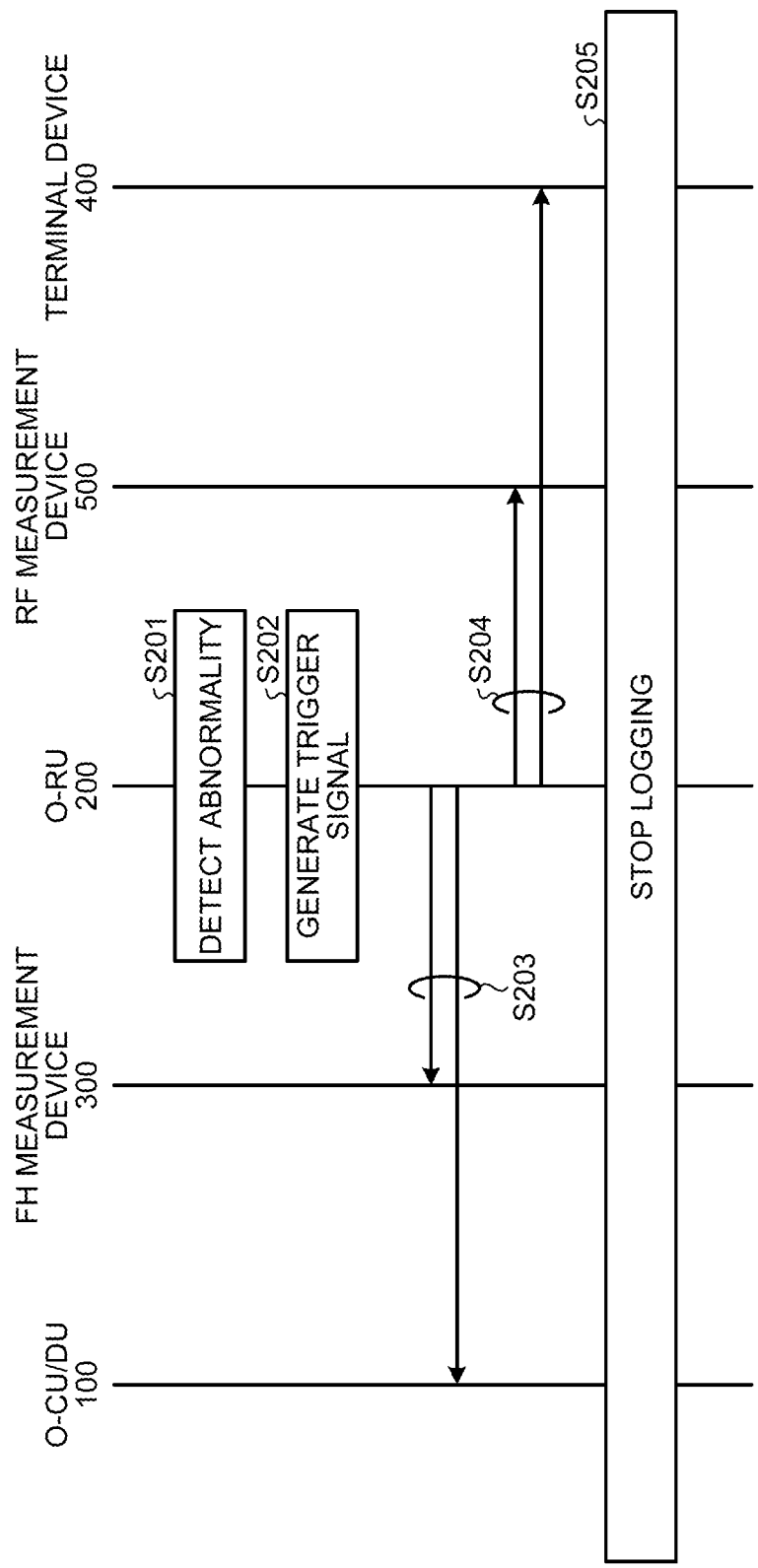

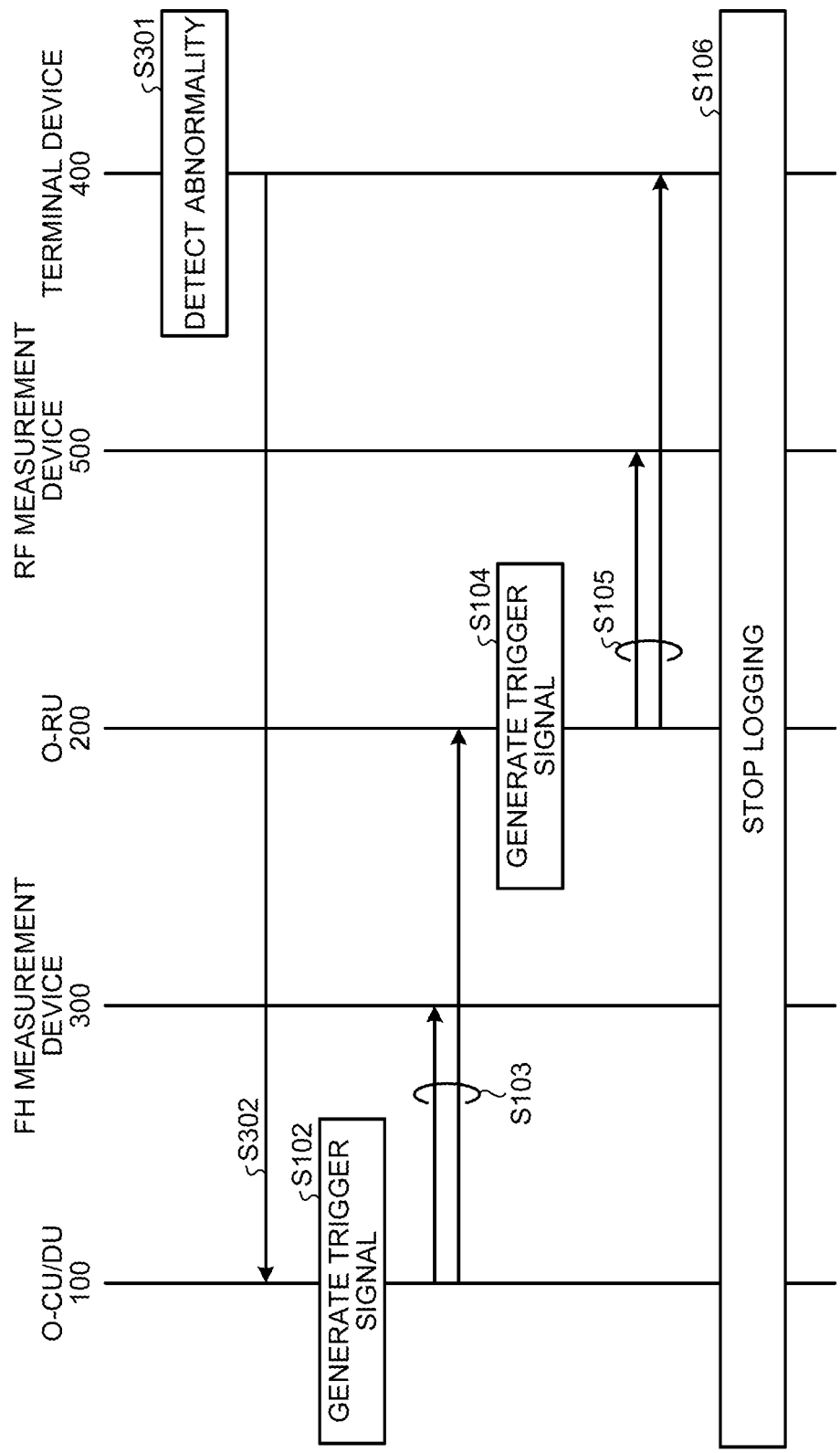

COMMUNICATION SYSTEM, COMMUNICATION DEVICE, AND ABNORMALITY MONITORING METHOD

CROSS-REFERENCE TO RELATED APPLICATION

This application is based upon and claims the benefit of priority of the prior Japanese Patent Application No. 2021-052704, filed on Mar. 26, 2021, the entire contents of which are incorporated herein by reference.

FIELD

The embodiment discussed herein is related to a communication system, a communication device, and an abnormality monitoring method.

BACKGROUND

In recent years, for example, with the development of Internet of Things (IoT) services, communication systems increasingly cope with services having various requirements. Thus, in the communication standard for the fifth generation mobile communication (5G or New Radio (NR)), in addition to the standard technology of the fourth generation mobile communication (4G), there is a demand for a technology that implements higher-data-rate, higher-capacity, and lower-latency communication.

In the communication systems including 5G, various communication devices provided by different vendors are used and, in recent years, open interfaces common to these communication devices are studied. Specifically, for example, an industry group called the open radio access network alliance (O-RAN alliance) founded in 2018 is trying to design interfaces interoperable among communication devices provided by different vendors.

Patent Document 1: Japanese Laid-open Patent Publication No. H05-100761
Patent Document 2: Japanese Laid-open Patent Publication No. 2002-026909
Patent Document 3: Japanese Laid-open Patent Publication No. 2001-326916

However, if an abnormality, such as a failure, occurs in, for example, a communication device, there is a problem in that it takes time to specify the abnormal event due to different operations of the communication devices for each of the vendors. Namely, if a communication system is constituted from a plurality of communication devices provided by different vendors, functions needed to analyze logs or the like at the time of an abnormal occurrence are not unified, and thus, specification or investigation of the abnormal event is not sometimes promptly and efficiently performed. In particular, in the communication system, for example, devices, such as a packet capture and a spectrum analyzer, that monitor a communication state are installed, and also, many communication devices are connected in combinations of various patterns. Consequently, it is difficult to specify an abnormal spot or its cause from each of the communication devices having mounted thereon functions that are different for each of the vendors.

SUMMARY

According to an aspect of an embodiment, a communication system includes a first communication device and a second communication device. The first communication device includes a first processor that executes a first process including: performing a logging process for recording an operation of the first communication device; monitoring whether an abnormal occurrence is present and suspending the logging process when the abnormal occurrence is detected; and generating a trigger signal that instructs to suspend the logging process when the abnormal occurrence is detected, and a transmitter that transmits the trigger signal. The second communication device includes a receiver that receives the trigger signal transmitted from the first communication device, and a second processor that executes a second process including: performing a logging process for recording an operation of the second communication device; and suspending the logging process when the trigger signal is received by the receiver.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a block diagram illustrating a configuration of a wireless device according to the embodiment;
FIG. 7 is a sequence diagram illustrating another abnormality monitoring method;
and
FIG. 8 is a sequence diagram illustrating still another abnormality monitoring method.

DESCRIPTION OF EMBODIMENTS

Preferred embodiments of the present invention will be explained with reference to accompanying drawings. Furthermore, the present invention is not limited to the embodiments.

Figure 1:
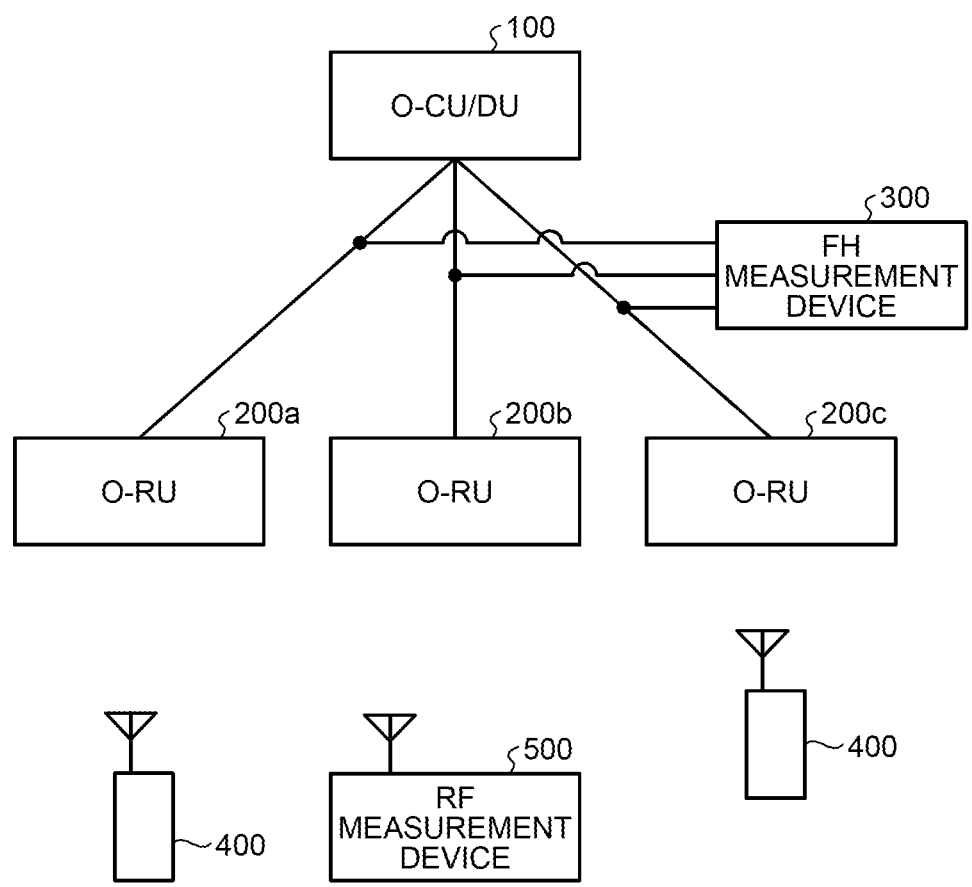
FIG. 1 is a diagram illustrating a configuration example of a communication system.

FIG. 1 is a diagram illustrating a configuration example of a communication system according to an embodiment. The communication system includes an open-central unit/distributed unit (O-CU/DU) 100 constituting a base station, open-radio units (O-RUs) 200a, 200b, and 200c, and terminal devices 400. Furthermore, the communication system includes a FH measurement device 300 that monitors fronthaul (FH) links that connect the O-CU/DU 100 and the O-RUs 200, a radio frequency (RF) measurement device 500 that monitors radio links connected to the O-RUs 200 and the terminal devices 400.

In a description below, the O-CU/DU 100, the O-RUs 200a, 200b, and 200c, and the FH measurement device 300 connected to the FH links are sometimes correctively referred to as a "FH device". Furthermore, the terminal device 400 and the RF measurement device 500 connected to the radio links are collectively referred to as a "wireless device".

The O-CU/DU 100 is a baseband processing unit that constitutes a base station. The O-CU/DU 100 is connected to a core network (not illustrated) and performs a baseband process on data.

The O-RUs 200a, 200b, and 200c are radio processing units constituting a base station. Each of the O-RUs 200a, 200b, and 200c is manufactured by a different vendor, but is connected to the common O-CU/DU 100 and performs a radio process on data. Namely, the O-RUs 200a, 200b, and 200c transmit and receive data to and from terminal devices 400 included in a cell by using radio transmission and radio reception.

The FH measurement device 300 monitors the FH links that connect the O-CU/DU 100 and the O-RUs 200a, 200b, and 200c. Namely, the FH measurement device 300 measures the number of packets that are transmitted and received between the O-CU/DU 100 and the O-RUs 200a, 200b, and 200c through the FH links or measures a transmission speed.

Each of the FH devices performs a logging process of recording the own operation as a log. However, as will be described later, the FH device suspends the logging process in a case where an abnormality is detected by any one of the communication devices including the own device included in the communication system and a trigger signal is transmitted.

The terminal devices 400 perform radio communication with the O-RUs 200a, 200b, and 200c that form a cell in which the own devices are present.

The RF measurement device 500 monitors radio links that connect the O-RUs 200a, 200b, and 200c and the terminal device 400. Namely, the RF measurement device 500 measures a radio field intensity of a radio link between each of the O-RUs 200a, 200b, and 200c and the terminal device 400 or measures a propagation environment.

These wireless devices each perform the logging process for recording the own operation as a log. However, as will be described later, the wireless devices each suspend the logging process in a case where an abnormality is detected by any one of the communication devices including the own device included in the communication system and a trigger signal is transmitted.

Figure 2:
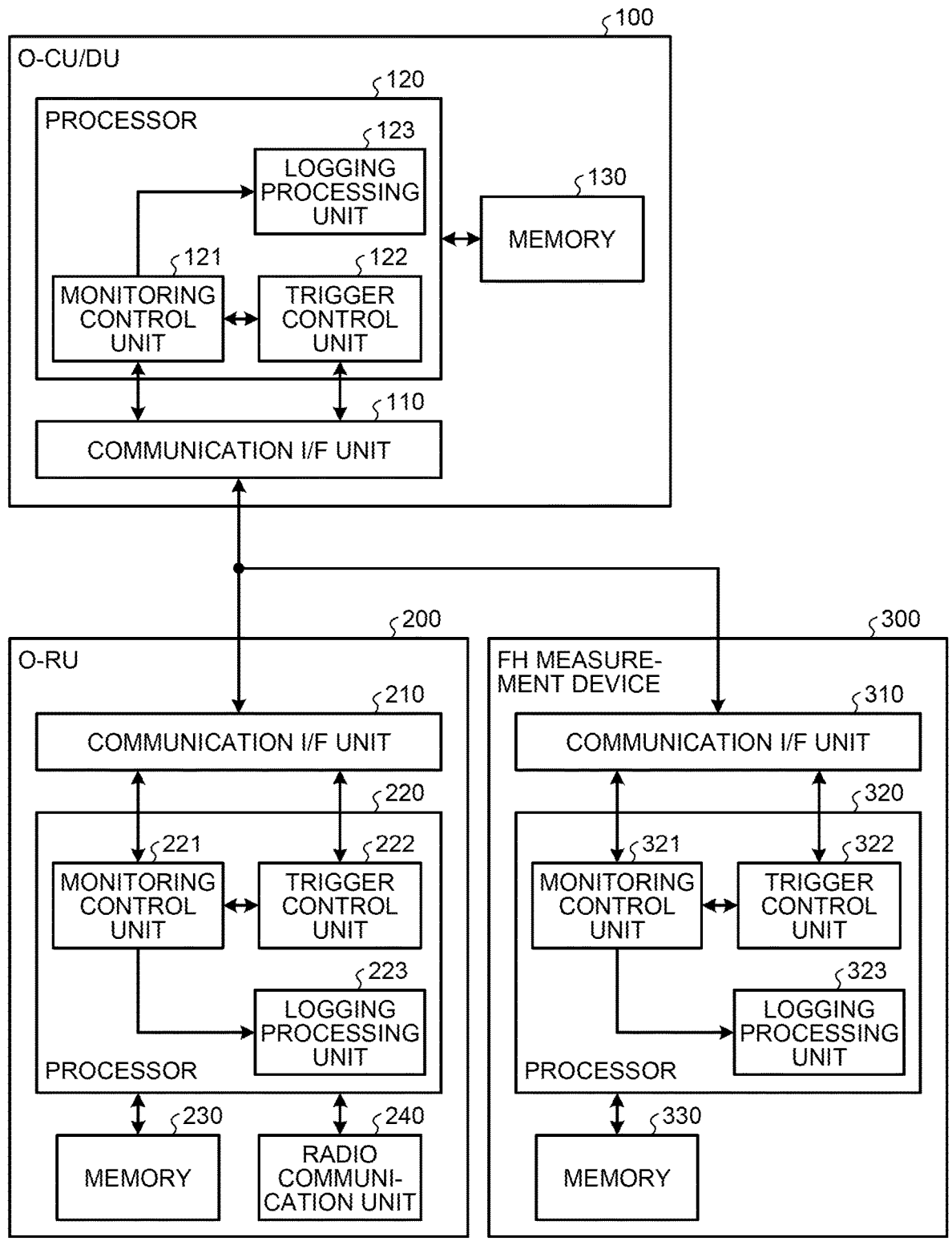
FIG. 2 is a block diagram illustrating a configuration of a FH device according to an embodiment.

FIG. 2 is a block diagram illustrating a configuration of the FH device according to an embodiment. Namely, FIG. 2 is a block diagram illustrating a configuration of the O-CU/DU 100, the O-RU 200, and the FH measurement device 300. Furthermore, in FIG. 2, only the configuration related to abnormality monitoring is illustrated and the other configurations are not illustrated.

The O-CU/DU 100 illustrated in FIG. 2 includes a communication interface unit (hereinafter, simply referred to as a "communication I/F unit") 110, a processor 120, and a memory 130.

The communication I/F unit 110 is an interface for connecting the other FH device. The communication I/F unit 110 notifies of an abnormal occurrence if an abnormality is detected, and transmits and receives a trigger signal serving as a trigger for suspending a logging process.

The processor 120 includes, for example, a central processing unit (CPU), a field programmable gate array (FPGA), a digital signal processor (DSP), or the like and performs overall control of the O-CU/DU 100. Specifically, the processor 120 includes a monitoring control unit 121, a trigger control unit 122, and a logging processing unit 123.

The monitoring control unit 121 monitors an operation of the O-CU/DU 100 and detects an occurrence of an abnormality. Then, if the monitoring control unit 121 detects an occurrence of an abnormality, the monitoring control unit 121 notifies the trigger control unit 122 of this state and instructs the logging processing unit 123 to suspend the logging process. Furthermore, the monitoring control unit 121 monitors whether the trigger signal has been received in the communication I/F unit 110 and instructs, if the trigger signal has been received, the logging processing unit 123 to suspend the logging process.

If an abnormal occurrence is notified from the monitoring control unit 121, the trigger control unit 122 notifies of the abnormal occurrence and generates a trigger signal for an instruction to suspend the logging process. Then, the trigger control unit 122 causes the trigger signal to be transmitted from the communication I/F unit 110 to the O-RU 200 and the FH measurement device 300.

The logging processing unit 123 performs the logging process for recording an operation of the O-CU/DU 100 as a log. Then, if an instruction to suspend the logging process is received from the monitoring control unit 121, the logging processing unit 123 suspends the logging process. The log recorded by the logging process is used to specify an abnormal event. Namely, by referring to a log after the stop of the logging process, the spot in which an abnormality has occurred and the cause of the abnormality are specified.

The memory 130 includes, for example, a random access memory (RAM), a read only memory (ROM), or the like and stores information that is used for a process performed by the processor 120.

The O-RU 200 illustrated in FIG. 2 includes a communication I/F unit 210, a processor 220, a memory 230, and a radio communication unit 240.

The communication I/F unit 210 is an interface for connecting another FH device. If an abnormality is detected, the communication I/F unit 210 notifies of the abnormal occurrence, and transmits and receives a trigger signal serving as a trigger for suspending a logging process.

The processor 220 includes, for example, a CPU, an FPGA, a DSP, or the like and performs overall control of the O-RU 200. Specifically, the processor 220 includes a monitoring control unit 221, a trigger control unit 222, and a logging processing unit 223.

The monitoring control unit 221 monitors an operation of the O-RU 200 and detects an occurrence of an abnormality. Then, if the monitoring control unit 221 detects an occurrence of an abnormality, the monitoring control unit 221 notifies the trigger control unit 222 of this state and instructs the logging processing unit 223 to suspend the logging process. Furthermore, the monitoring control unit 221 monitors whether the trigger signal has been received in the communication I/F unit 210 and instructs, if the trigger signal has been received, the logging processing unit 223 to suspend the logging process. Furthermore, if the trigger signal has been received by the communication I/F unit 210, the monitoring control unit 221 notifies the trigger control unit 222 of this state.

If the abnormal occurrence is notified from the monitoring control unit 221, the trigger control unit 222 notifies of the abnormal occurrence and generates a trigger signal for an instruction to suspend the logging process. Then, the trigger control unit 122 causes the trigger signal to be transmitted from the communication I/F unit 110 to the O-CU/DU 100 and the FH measurement device 300. Furthermore, if the abnormal occurrence is notified from the monitoring control unit 221 and if reception of the trigger signal is notified from the monitoring control unit 221, the trigger control unit 222 generates a trigger signal that is transmitted by using radio transmission. Then, the trigger control unit 122 causes the trigger signal to be transmitted from the radio communication unit 240 to the terminal device 400 and the RF measurement device 500.

The logging processing unit 223 performs the logging process for recording an operation of the O-RU 200 as a log. Then, if an instruction to suspend the logging process is received from the monitoring control unit 221, the logging processing unit 223 suspends the logging process.

The memory 230 includes, for example, a RAM, a ROM, or the like and stores information that is used for a process performed by the processor 220.

The radio communication unit 240 is an interface capable of performing radio communication with the terminal devices 400 and the RF measurement device 500 that are wireless devices. The radio communication unit 240 transmits, by using radio transmission, the trigger signal generated by the trigger control unit 222 to the terminal devices 400 and the RF measurement device 500.

The FH measurement device 300 illustrated in FIG. 2 includes a communication I/F unit 310, a processor 320, and a memory 330.

The communication I/F unit 310 is an interface for connecting another FH device. If an abnormality is detected, the communication I/F unit 310 notifies of an abnormal occurrence, and transmits and receives a trigger signal for a trigger for suspending a logging process.

The processor 320 includes, for example, a CPU, an FPGA, a DSP, or the like and performs overall control of the FH measurement device 300. Specifically, the processor 320 includes a monitoring control unit 321, a trigger control unit 322, and a logging processing unit 323.

The monitoring control unit 321 monitors an operation of the FH measurement device 300 and detects an occurrence of an abnormality. Then, if the monitoring control unit 321 detects an occurrence of an abnormality, the monitoring control unit 321 notifies the trigger control unit 322 of this state and instructs the logging processing unit 323 to suspend the logging process. Furthermore, the monitoring control unit 321 monitors whether the trigger signal has been received in the communication I/F unit 310 and instructs, if the trigger signal has been received, the logging processing unit 323 to suspend the logging process.

If the abnormal occurrence is notified from the monitoring control unit 321, the trigger control unit 322 notifies of the abnormal occurrence and generates a trigger signal for an instruction to suspend the logging process. Then, the trigger control unit 322 causes the trigger signal to be transmitted from the communication I/F unit 310 to the O-CU/DU 100 and the O-RU 200.

The logging processing unit 323 performs the logging process for recording an operation of the FH measurement device 300 as a log. Then, if an instruction to suspend the logging process is received from the monitoring control unit 321, the logging processing unit 323 suspends the logging process.

The memory 330 includes, for example, a RAM, a ROM, or the like and stores information that is used for a process performed by the processor 320.

FIG. 3 is a block diagram illustrating a configuration of the wireless devices according to an embodiment. Namely, FIG. 3 is a block diagram illustrating a configuration of each of the terminal device 400 and the RF measurement device 500. Furthermore, in FIG. 3, only the configuration related to abnormality monitoring is illustrated and the other configurations are not illustrated.

The terminal device 400 illustrated in FIG. 3 includes a radio communication unit 410, a processor 420, and a memory 430.

The radio communication unit 410 is an interface for performing a radio connection to the O-RU 200. If an abnormality is detected, the radio communication unit 410 notifies of an abnormal occurrence, and transmits and receives a trigger signal serving as a trigger for suspending a logging process.

The processor 420 includes, for example, a CPU, an FPGA, a DSP, or the like and performs overall control of the terminal device 400. Specifically, the processor 420 includes a monitoring control unit 421, a trigger control unit 422, and a logging processing unit 423.

The monitoring control unit 421 monitors an operation of the terminal device 400 and detects an occurrence of an abnormality. Then, if the monitoring control unit 421 detects an occurrence of an abnormality, the monitoring control unit 421 notifies the trigger control unit 422 of this state and instructs the logging processing unit 423 to suspend the logging process. Furthermore, the monitoring control unit 421 monitors whether the trigger signal has been received in the radio communication unit 410 and instructs, if the trigger signal has been received, the logging processing unit 423 to suspend the logging process.

If the abnormal occurrence is notified from the monitoring control unit 421, the trigger control unit 422 notifies of the abnormal occurrence and generates a trigger signal for an instruction to suspend the logging process. Then, the trigger control unit 422 causes the trigger signal to be transmitted from the radio communication unit 410 to the O-RUs 200 and the RF measurement device 500 by using radio transmission.

The logging processing unit 423 performs the logging process for recording an operation of the terminal device 400 as a log. Then, if an instruction to suspend the logging process is received from the monitoring control unit 421, the logging processing unit 423 suspends the logging process.

The memory 430 includes, for example, a RAM, a ROM, or the like and stores information that is used for a process performed by the processor 420.

The RF measurement device 500 illustrated in FIG. 3 includes a radio communication unit 510, a processor 520, and a memory 530.

The radio communication unit 510 is an interface for performing a radio connection to the O-RU 200. If an abnormality is detected, the radio communication unit 510 notifies of an abnormal occurrence, and transmits and receives a trigger signal serving as a trigger for suspending a logging process.

The processor 520 includes, for example, a CPU, an FPGA, a DSP, or the like and performs overall control of the RF measurement device 500. Specifically, the processor 520 includes a monitoring control unit 521, a trigger control unit 522, and a logging processing unit 523.

The monitoring control unit 521 monitors an operation of the RF measurement device 500 and detects an occurrence of an abnormality. Then, if the monitoring control unit 521 detects an occurrence of an abnormality, the monitoring control unit 521 notifies the trigger control unit 522 of this state and instructs the logging processing unit 523 to suspend the logging process. Furthermore, the monitoring control unit 521 monitors whether the trigger signal has been received in the radio communication unit 510 and instructs, if the trigger signal has been received, the logging processing unit 523 to suspend the logging process.

If an abnormal occurrence is notified from the monitoring control unit 521, the trigger control unit 522 notifies of the abnormal occurrence and generates a trigger signal for an instruction to suspend the logging process. Then, the trigger control unit 522 causes the trigger signal to be transmitted from the radio communication unit 510 to the O-RUs 200 and the terminal devices 400 by using radio transmission.

The logging processing unit 523 performs the logging process for recording an operation of the RF measurement device 500 as a log. Then, if an instruction to suspend the logging process is received from the monitoring control unit 521, the logging processing unit 523 suspends the logging process.

The memory 530 includes, for example, a RAM, a ROM, or the like and stores information that is used for a process performed by the processor 520.

Figure 4:
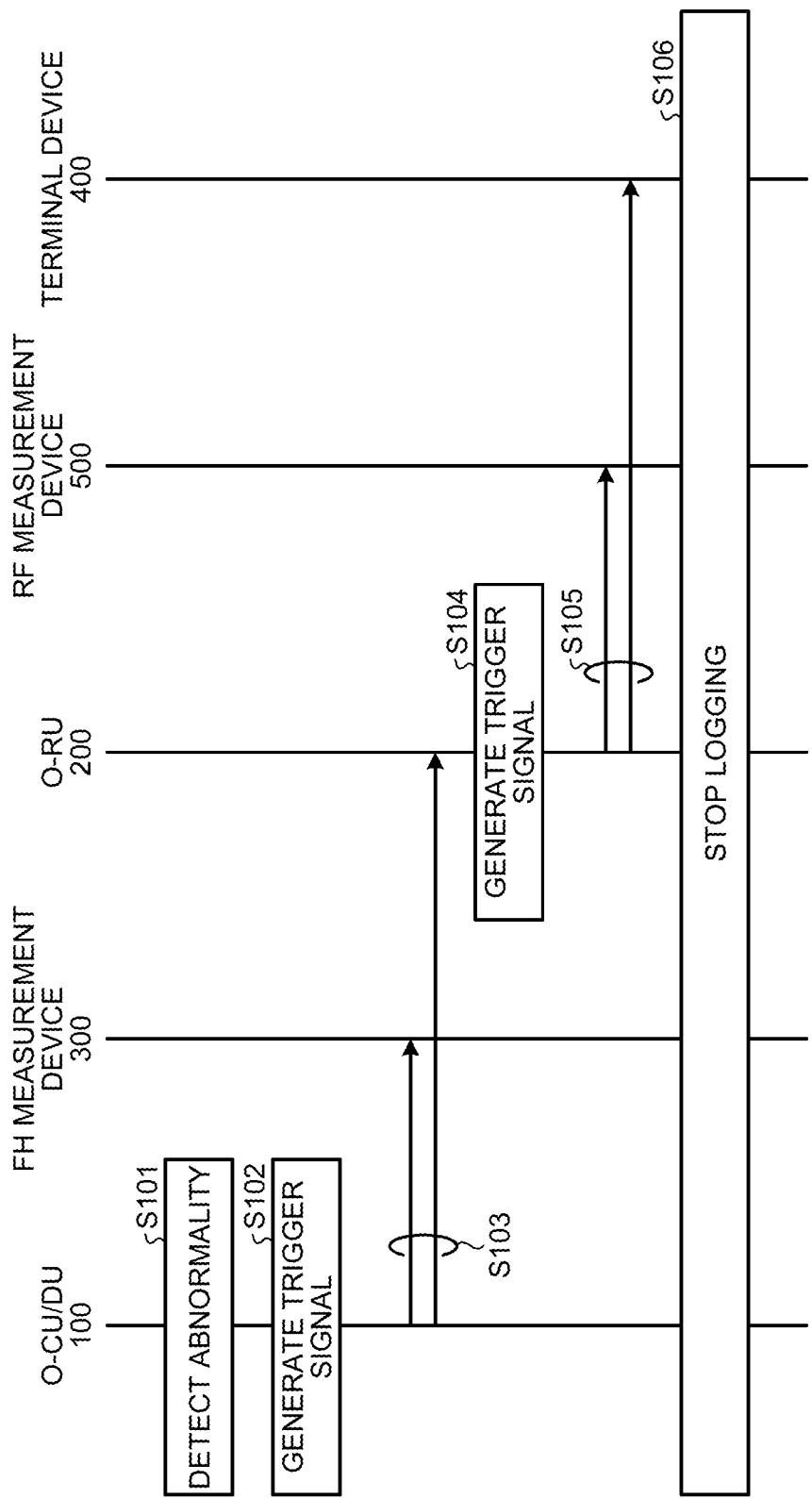
FIG. 4 is a sequence diagram illustrating an abnormality monitoring method.

In the following, an abnormality monitoring method performed in a communication system having the configuration described above will be described with reference to the sequence diagram illustrated in FIG. 4. Here, an operation of a case in which an abnormality is detected in the O-CU/DU 100 will be described.

If an abnormality occurs in the O-CU/DU 100, the abnormality is detected by the monitoring control unit 121 (Step S101). This abnormality is detected in a case where, in a communication process performed by, for example, the O-CU/DU 100, a parameter related to a signal becomes a value that exceeds a predetermined threshold or an operation of the O-CU/DU 100 is different from a normal operation.

If the abnormality is detected, this state is notified to the trigger control unit 122, and a trigger signal is generated by the trigger control unit 122 (Step S102). Specifically, in a signal format that is transmitted and received between the FH devices illustrated in, for example, FIG. 5, reserved bits 625 notify of an abnormal occurrence, and a trigger signal with bits that have been changed to bits (for example "1") that instruct to suspend the logging process is generated.

Figure 5:
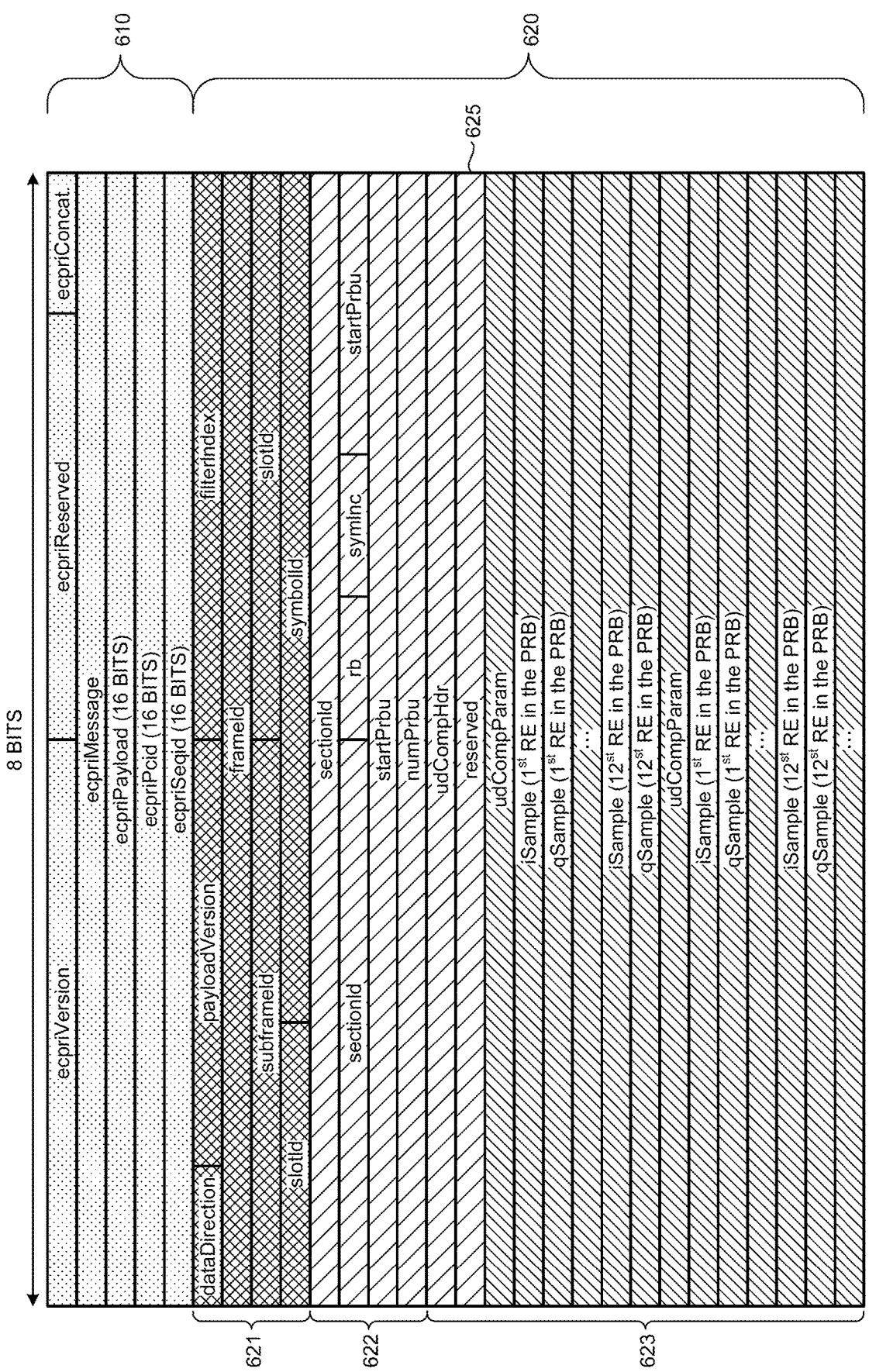
FIG. 5 is a diagram illustrating a specific example of a trigger signal.

The signal format illustrated in FIG. 5 includes a header 610 and a payload 620. The header 610 includes information indicating a type of message, identification information on a transmission source and a transmission destination, information on a sequence number of a message, and the like. Furthermore, the payload 620 includes, for example, time resource information 621, frequency resource information 622, and IQ information 623. The IQ information 623 is a bit area that is used to transmit user data; however, the reserved bits 625 are spare bits that belong to the IQ information 623 but are not used for transmission of the user data or the like.

When the trigger control unit 122 generates a trigger signal, in a signal in the signal format illustrated in, for example, FIG. 5, the trigger control unit 122 generates a trigger signal by changing the reserved bits 625 to bits (for example "1") that are different from normally used bits (for example "0"). Furthermore, the trigger signal generated by the trigger control unit 122 is not limited to the signal format illustrated in FIG. 5, and a trigger signal may be generated by using reserved bits or extension bits in various signal formats transmitted or received by the FH device.

The generated trigger signal is transmitted from the communication I/F unit 110 to each of the O-RU 200 and the FH measurement device 300 (Step S103). If the trigger signal is received by the communication I/F unit 210 in the O-RU 200, reception of the trigger signal is detected by the monitoring control unit 221. Then, the reception of the trigger signal is notified to the trigger control unit 222, and the trigger signal that is transmitted by using radio transmission is generated by the trigger control unit 222 (Step S104). Specifically, in a broadcast signal illustrated in, for example, FIG. 6, resource blocks 701 and 702 having the same symbol as that of the primary synchronization signal (PSS) notifies of an abnormal occurrence, and a trigger signal including a signal pattern that instructs to suspend the logging process is generated.

Figure 6:
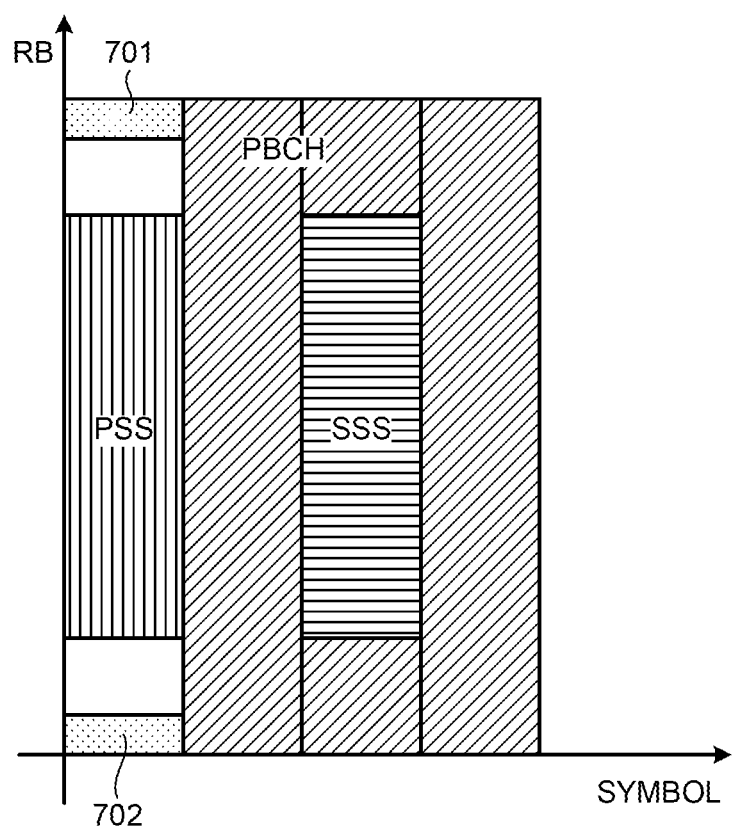
FIG. 6 is a diagram illustrating another specific example of a trigger signal.

The broadcast signal illustrated in FIG. 6 is referred to as an SS/PBCH Block (SSB) and is a signal containing a synchronization signal (SS) and a physical broadcast channel (PBCH). The SSB is constituted of four symbols, the first symbol includes the PSS, the second symbol includes the PBCH, the third symbol includes the PBCH and a secondary synchronization signal (SSS), and the fourth symbol includes the PBCH. The resource blocks located before and after the PSS included in the first symbol in this SSB are free spaces; therefore, the trigger control unit 222 generates a trigger signal by mapping a signal pattern indicating the trigger signal onto the resource blocks 701 and 702 that are the free spaces. Furthermore, the trigger signal generated by the trigger control unit 222 is not limited to the SSB illustrated in FIG. 6, and a trigger signal may be generated by using free spaces of various signals that are transmitted from the O-RU 200 by using radio transmission.

The generated trigger signal is transmitted from the radio communication unit 240 to each of the terminal device 400 and the RF measurement device 500 by using radio transmission (Step S105). If the trigger signal is received by each of the radio communication units 410 and 510 included in the terminal device 400 and the RF measurement device 500, reception of the trigger signal is detected by the respective monitoring control units 421 and 521. Then, the logging process that is being performed by each of the logging processing units 423 and 523 is suspended as a result of the instruction being received from the respective monitoring control units 421 and 521 (Step S106).

Furthermore, in the O-CU/DU 100, because the abnormality has been detected by the monitoring control unit 121, the logging process that is being performed by the logging processing unit 123 is suspended as a result of the instruction being received from the monitoring control unit 121 (Step S106). In the O-RU 200, because reception of the trigger signal has been detected by the monitoring control unit 221, the logging process that is being performed by the logging processing unit 223 is suspended as a result of the instruction being received from the monitoring control unit 221 (Step S106). Similarly, in the FH measurement device 300, because reception of the trigger signal has been detected by the monitoring control unit 321, the logging process that is being performed by the logging processing unit 323 is suspended as a result of the instruction being received from the monitoring control unit 321 (Step S106).

In this way, if an occurrence of an abnormality is detected in a single communication device (in this case, the O-CU/DU 100), a trigger signal is transmitted to all of the communication devices constituting the communication system, and the communication device that has detected the occurrence of the abnormality and the communication device that has received the trigger signal suspend their logging processes. Namely, at the time of abnormal occurrence, all of the communication devices constituting the communication system almost simultaneously stop their logging processes; therefore, it is possible to easily compare and refer to the log for each of the communication devices recorded for a duration of time until the abnormality occurs, and it is thus possible to efficiently specify an abnormal event. In other words, it is possible to implement prompt and efficient specification of the abnormal event.

As described above, according to the embodiment, the communication device that has detected the abnormality transmits a trigger signal that instructs to suspend the logging process to all of the communication devices included in the communication system and stops the logging process. Then, the communication devices that receive the trigger signal also stop their logging processes. Consequently, at the time of abnormal occurrence, all of the communication devices constituting the communication system almost simultaneously stop their logging processes and are able to easily compare and refer to the log for each of the communication devices recorded for a duration of time until the abnormality occurs. As a result, it is possible to implement prompt and efficient specification of the abnormal event.

Furthermore, in one embodiment described above, a case in which an abnormal occurrence is detected by the O-CU/DU 100 and the trigger signal is transmitted from the O-CU/DU 100 to each of the communication devices has been described; however, detection of the abnormal occurrence and transmission of the trigger signal may also be performed by another communication device. In the following, two specific examples will be described.

FIG. 7 is a sequence diagram illustrating an abnormality monitoring method in a case where an abnormality is detected in the O-RU 200.

If an abnormality occurs in the O-RU 200, the abnormality is detected by the monitoring control unit 221 (Step S201). The abnormality is detected in, for example, the communication process performed by the O-RU 200 when a parameter related to a signal becomes a value that exceeds a predetermined threshold or when an operation of the O-RU 200 is different from a normal operation.

If the abnormality is detected, this state is notified to the trigger control unit 222, and a trigger signal is generated by the trigger control unit 222 (Step S202). Specifically, in the signal format that is used for transmission and reception between the FH devices illustrated in, for example, FIG. 5, the reserved bits 625 notify of an abnormal occurrence, and a trigger signal with bits that have been changed to bits (for example "1") that instruct to suspend the logging process is generated. Furthermore, in the broadcast signal illustrated in, for example, FIG. 6, the resource blocks 701 and 702 each having the same symbol as that of the PSS notify of the abnormal occurrence, and a trigger signal including a signal pattern that instructs to suspend the logging process is generated. Namely, the trigger signal that is transmitted through the FH link the trigger signal that is transmitted through the radio link are generated by the trigger control unit 222.

The trigger signal transmitted through the FH link is transmitted from the communication I/F unit 210 to each of the O-CU/DU 100 and the FH measurement device 300 (Step S203). The trigger signal is received by each of the communication I/F units 110 and 310 included in the O-CU/DU 100 and the FH measurement device 300, respectively, reception of the trigger signals is detected by the respective monitoring control units 121 and 321. Then, the logging process that is being performed by the logging processing units 123 and 323 as a result of the instruction being received from the respective monitoring control units 121 and 321 (Step S205).

In contrast, the trigger signal that is transmitted through the radio link is transmitted from the radio communication unit 240 to each of the terminal device 400 and the RF measurement device 500 (Step S204). If the trigger signal is received by each of the radio communication units 410 and 510 in the terminal device 400 and the RF measurement device 500, the trigger signal is detected by the respective monitoring control units 421 and 521. Then, the logging process that is being performed by the logging processing units 423 and 523 is suspended as a result of an instruction being received from the respective monitoring control units 421 and 521 (Step S205). Furthermore, in the O-RU 200, because the abnormality has been detected by the monitoring control unit 221, the logging process that is being performed by the logging processing unit 223 is suspended as a result of an instruction being received from the monitoring control unit 221 (Step S205).

In this way, even if the occurrence of the abnormality is detected in the O-RU 200, the trigger signal is also transmitted to all of the communication devices constituting the communication system, and all of the communication devices stop their logging processes. Namely, at the time of an abnormal occurrence, all of the communication devices constituting the communication system almost simultaneously stop the logging process; therefore, it is possible to easily compare and refer to the log for each of the communication devices recorded for a duration of time until the abnormality occurs, and it is thus possible to efficiently specify an abnormal event. In other words, it is possible to implement prompt and efficient specification of the abnormal event.

FIG. 8 is a sequence diagram illustrating an abnormality monitoring method in a case where an abnormality is detected in the terminal device 400, and a trigger signal is transmitted by the O-CU/DU 100. In FIG. 8, components that are the same as those illustrated in FIG. 4 are assigned the same reference numerals.

If an abnormality occurs in the terminal device 400, the abnormality is detected by the monitoring control unit 421 (Step S301). The abnormality is detected in, for example, the communication process performed by the terminal device 400 when a parameter related to a signal becomes a value that exceeds a predetermined threshold or when an operation of the terminal device 400 is different from a normal operation.

If the abnormality is detected, an abnormality notification for reporting this state is generated by the monitoring control unit 421 and is transmitted from the radio communication unit 410 to the O-CU/DU 100 via the O-RU 200 (Step S302). The abnormality notification is received by the communication I/F unit 110 in the O-CU/DU 100, and a state in which the abnormality has occurred in the terminal device 400 is detected by the monitoring control unit 121. Then, this state is notified to the trigger control unit 122, and a trigger signal is generated by the trigger control unit 122 (Step S102). Specifically, in the signal format that is used for transmission and reception between the FH devices illustrated in, for example, FIG. 5, the reserved bits 625 notify of an abnormal occurrence, and a trigger signal with bits that have been changed to bits (for example "1") that instruct to suspend the logging process is generated.

The generated trigger signal is transmitted from the communication I/F unit 110 to the O-RU 200 and the FH measurement device 300 (Step S103). If the trigger signal is received by the communication I/F unit 210 in the O-RU 200, reception of the trigger signal is detected by the monitoring control unit 221. Then, a state in which the trigger signal has been received is notified to the trigger control unit 222, a trigger signal that is transmitted by using radio transmission is generated by the trigger control unit 222 (Step S104). Specifically, for example, in the broadcast signal illustrated in FIG. 6, the resource blocks 701 and 702 each having the same symbol as that of the PSS notify of the abnormal occurrence, and a trigger signal including a signal pattern that instructs to suspend the logging process is generated.

The generated trigger signal is transmitted from the radio communication unit 240 to each of the terminal device 400 and the RF measurement device 500 by using radio transmission (Step S105). If the trigger signal is received by the radio communication units 410 and 510 in the terminal device 400 and the RF measurement device 500, respectively, reception of the trigger signal is detected by the respective monitoring control units 421 and 521. Then, the logging process that is being processed by each of the logging processing units 423 and 523 is suspended as a result of an instruction being received from the respective monitoring control units 421 and 521 (Step S106). Similarly, in also the O-CU/DU 100, the O-RU 200, and the FH measurement device 300, the logging process that is being performed by each of the logging processing units 123, 223, and 323 is suspended (Step S106).

In this way, if an occurrence of an abnormality is detected in the terminal device 400, a trigger signal is transmitted to all of the communication devices from the O-CU/DU 100 that detects the abnormality from the report received from the terminal device 400, and all of the communication devices stop their logging processes. Namely, at the time of an abnormal occurrence, all of the communication devices constituting the communication system almost simultaneously stop their logging processes; therefore, it is possible to easily compare and refer to the log for each of the communication devices recorded for a duration of time until the abnormality occurs, and it is thus possible to efficiently specify an abnormal event. In other words, it is possible to implement prompt and efficient specification of the abnormal event.

According to an aspect of an embodiment of the communication system, the communication device, and the abnormality monitoring method disclosed in the present application, an advantage is provided in that it is possible to implement prompt and efficient specification of the abnormal event.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
   a first communication device; and
   a second communication device, wherein the first communication device includes a first processor that executes a first process including:
   performing a logging process for recording an operation of the first communication device;
   monitoring whether an abnormal occurrence is present and suspending the logging process when the abnormal occurrence is detected; and
   generating a trigger signal that instructs to suspend, when the abnormal occurrence is detected, a logging process performed in the second communication device, and
   a transmitter that transmits the trigger signal, and
   the second communication device includes
   a receiver that receives the trigger signal transmitted from the first communication device, and
   a second processor that executes a second process including:
   performing a logging process for recording an operation of the second communication device; and
   suspending the logging process when the trigger signal is received by the receiver.

2. The communication system according to claim 1, wherein
   the second process further includes generating, when the trigger signal is received by the receiver, another trigger signal to be transmitted via a different link that is different from a link through which the received trigger signal is transmitted, and
   the second communication device further includes
   a transmitter that transmits the other trigger signal by using the different link.

3. The communication system according to claim 1, wherein the generating includes generating the trigger signal that instructs to suspend the logging process by using reserved bits or extension bits in a signal format transmitted and received to and from the first communication device and the second communication device.

4. The communication system according to claim 1, wherein the generating includes generating the trigger signal that instructs to suspend the logging process by using a free space of a signal that includes a synchronization signal and a broadcast channel and that is transmitted and received in a radio link.

5. The communication system according to claim 1, wherein the monitoring includes detecting the abnormal occurrence by a report received from another device included in the communication system.

6. An abnormality monitoring method used in a communication system that includes a first communication device and a second communication device, the abnormality monitoring method comprising:
   performing, by the first communication device using a first processor, a logging process for recording an operation of the first communication device;
   monitoring, by the first communication device using the first processor, whether an abnormal occurrence is present;
   suspending, by the first communication device using the first processor, the logging process performed in the first communication device when detecting the abnormal occurrence;
   generating, by the first communication device using the first processor when detecting the abnormal occurrence, a trigger signal that instructs to suspend a logging process performed in the second communication device;
   transmitting, by the first communication device, the generated trigger signal;
   performing, by the second communication device using a second processor, a logging process for recording an operation of the second communication device;
   receiving, by the second communication device, the trigger signal transmitted from the first communication device; and suspending, by the second communication device using the second processor, the logging process performed in the second communication device when receiving the trigger signal.

\* \* \* \* \*